(12) United States Patent
Choi et al.

(10) Patent No.: US 8,446,891 B2
(45) Date of Patent: May 21, 2013

(54) METHOD AND APPARATUS FOR GENERATING, TRANSMITTING, AND RECEIVING A DATA FRAME IN A WIRELESS COMMUNICATION SYSTEM

(75) Inventors: Jeeyon Choi, Daejeon (KR); Jaewoo Park, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/443,509

(22) Filed: Apr. 10, 2012

(65) Prior Publication Data

US 2012/0195301 A1 Aug. 2, 2012

Related U.S. Application Data

(63) Continuation of application No. PCT/KR2010/007740, filed on Nov. 4, 2010.

(30) Foreign Application Priority Data

Nov. 4, 2009 (KR) ................. 10-2009-0106151
Jan. 20, 2010 (KR) ................. 10-2010-0005284
Jul. 9, 2010 (KR) ................. 10-2010-0066599

(51) Int. Cl.
*H04W 4/00* (2009.01)
(52) U.S. Cl.
USPC ........................................................ 370/338
(58) Field of Classification Search
USPC ........... 370/294, 330–338, 345, 395.1, 395.4, 370/442, 458, 470, 472, 473, 476, 478; 455/231; 379/88.09
See application file for complete search history.

(56) References Cited

U.S. PATENT DOCUMENTS

| | | | |
|---|---|---|---|
| 7,062,703 B1 | 6/2006 | Keaney et al. | |
| 2005/0286446 A1 | 12/2005 | Barber | |
| 2007/0064738 A1* | 3/2007 | Takagi et al. | 370/473 |
| 2007/0110103 A1 | 5/2007 | Zimmerman et al. | |
| 2009/0262677 A1* | 10/2009 | Banerjea et al. | 370/312 |

(Continued)

FOREIGN PATENT DOCUMENTS

| | | |
|---|---|---|
| KR | 1020010041310 A | 5/2001 |
| KR | 1020050028242 A | 3/2005 |

(Continued)

OTHER PUBLICATIONS

International Search Report for PCT/KR2010/007740 filed on Nov. 4, 2010.

(Continued)

*Primary Examiner* — Kwang B Yao
*Assistant Examiner* — Tung Q Tran

(57) ABSTRACT

The present invention relates to a technique relating to a method and apparatus for generating, transmitting, and receiving a data frame having a newly proposed format in a wireless communication system. According to the technique, the method for generating a data frame in a wireless communication system comprises the following steps: generating at least one first subframe; generating at least one second subframe; and generating a data frame including the first and second subframes, wherein the first and second subframes include length information of a MAC protocol data unit (MPDU) contained in the first and second subframes, and the length information of the MPDU contained in the second subframe is zero.

28 Claims, 9 Drawing Sheets

U.S. PATENT DOCUMENTS

| | | | |
|---|---|---|---|
| 2009/0316670 A1* | 12/2009 | Grandham et al. | 370/338 |
| 2010/0040158 A1 | 2/2010 | Aggarwal et al. | |
| 2010/0146351 A1 | 6/2010 | Kakani et al. | |
| 2010/0157966 A1* | 6/2010 | Sugar et al. | 370/338 |
| 2011/0116487 A1 | 5/2011 | Grandhi | |
| 2011/0116489 A1 | 5/2011 | Grandhi | |
| 2011/0170627 A1 | 7/2011 | Kwon et al. | |
| 2012/0033614 A1 | 2/2012 | Sampath et al. | |
| 2012/0170565 A1* | 7/2012 | Seok | 370/338 |
| 2012/0195392 A1 | 8/2012 | Kushnir et al. | |

FOREIGN PATENT DOCUMENTS

| | | |
|---|---|---|
| KR | 1020080044321 A | 5/2008 |
| KR | 1020090084997 A | 8/2009 |
| KR | 1020090090970 A | 8/2009 |
| KR | 1020090119857 A | 11/2009 |
| WO | WO 2009/129367 A1 | 10/2009 |

OTHER PUBLICATIONS

Extended European Search Report for EP Application No. 10 82 8525 of Feb. 7, 2013.

Extended European Search Report for EP Application No. 11 75 3656 of Feb. 6, 2013.

Hemanth Sampath et al., "802.11ac Preamble", IEEE, Jul. 13, 2010, slides 10-15.

Wahyul Amien Syafei et al., "A Design of Next Generation Gigabit MIMO Wireless LAN System", The 12$^{th}$ International Conference on IEEE, Feb. 7, 2010, pp. 941-946, Advanced Communication Technology (ICACT).

Leonardo Lanante et al., "IEEE802.11ac Preamble with Legacy 802.11a/n Backward Compatibility", IEEE, Jul. 14, 2009, slide 11.

"Supplement to IEEE standard for information technology—Telecommunications and information exchange between systems—Local and metropolitan area networks—Specific requirements. Part 11: Wireless LAN Medium Access Control (MAC) and Physical Layer (PHY) specifications: High-speed Physical Layer in the 5 GHz Band", IEEE, Dec. 30, 1999, pp. 13-23.

Yong Liu et al., "VHT Frame Padding", IEEE, Jan. 19, 2010, slide 6.

Dionysios Skordoulis et al., "IEEE 802.11n Mac Frame Aggregation Mechanisms for Next-Generation High-Throughput WLANS", IEEE Wireless Communications, Feb. 2008, pp. 40-47.

David Astély, et al., "LTE: The Evolution of Mobile Broadband", LTE Part II: 3GPP Release 8, Apr. 2009, pp. 44-51.

Lin X. Cai et al., "A Distributed Multi-User MIMO MAC Protocol for Wireless Local Area Networks", 2008, pp. 1-5, IEEE "GLOBECOM".

International Search Report for PCT/KR2011/001740 filed on Mar. 11, 2011.

Notice of Allowance and List of References for U.S. Appl. No. 13/443,635 mailed Jan. 22, 2013.

* cited by examiner

METHOD AND APPARATUS FOR GENERATING, TRANSMITTING, AND RECEIVING A DATA FRAME IN A WIRELESS COMMUNICATION SYSTEM

TECHNICAL FIELD

The present invention relates to methods and apparatuses for generating, transmitting and receiving a data frame in a wireless communication system, and more particularly, to methods and apparatuses for generating, transmitting and receiving a data frame in a newly suggested format.

BACKGROUND ART

A wireless communication system, for example, a wireless local area system (WLAN) defined in IEEE 802.11 supports a basic service set (BSS) including an access point (AP) serving as an access point of a distributed system (DS) and a stator (STA).

According to IEEE 802.11, which is an international standard of the WLAN, in a media access control (MAC) layer, data is processed in a data unit called a MAC protocol data unit (MPDU). Here, in order to increase efficiency of the MAC layer for a speed of a physical (PHY) layer, IEEE 802.11 has suggested a method of aggregating a plurality of MPDUs to allow the aggregated MPDUs to be processed in a single data unit in the physical layer. The aggregated MPDU is called A-MPDU.

Meanwhile, recently, research into a method for simultaneously transceiving data from/to a plurality of receiving terminals in the same transmission period using a multi-channel and a multi-user multiple-input multiple-output (MU-MIMO) has been actively conducted.

DISCLOSURE

Technical Problem

The present invention provides methods and apparatuses for generating, transmitting and receiving a data frame in a new data frame format in a wireless communication system.

The present invention also provides methods and apparatuses for generating, transmitting and receiving a data frame allowing temporal lengths of data frames transmitted to each of a plurality of receiving terminals to be the same in a wireless communication system simultaneously transmitting data to the plurality of receiving terminals in the same transmission period.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

Technical Solution

In an aspect, a method for generating a data frame in a wireless communication system includes generating at least one first subframe, generating at least one second subframe, and generating a data frame including the first and second subframes. The first and second subframes include length information of media access control (MAC) protocol data units (MPDUs) included in the first and second subframes, and the length information of the MPDU included in the second subframe is 0.

In another aspect, a method for transmitting a data frame in a transmitting apparatus in a wireless communication system includes generating a data frame including at least one first subframe and at least one second subframe, and transmitting the data frame to a receiving terminal. The first and second subframes include length information of MPDUs included in the first and second subframes, and the length information of the MPDU included in the second subframe is 0.

In another aspect, a method for receiving a data frame in a receiving terminal in a wireless communication system includes receiving a data frame transmitted from a transmitting terminal and including at least one first subframe and at least one second subframe, and transmitting an ACK frame for the data frame to the transmitting terminal. The first and second subframes include length information of MPDUs included in the first and second subframes, and the length information of the MPDU included in the second subframe is 0.

In another aspect, a device for generating a data frame in a wireless communication system includes a first frame generator for generating at least one first subframe, a second frame generator for generating at least one second subframe, and a third frame generator for generating a data frame including the first and second subframes. The first and second subframes include length information of media access control (MAC) protocol data units (MPDUs) included in the first and second subframes, and the length information of the MPDU included in the second subframe is 0.

In another aspect, a device for transmitting a data frame in a transmitting apparatus in a wireless communication system includes a frame generator for generating a data frame including at least one first subframe and at least one second subframe, and a frame transmitting unit for transmitting the data frame to a receiving terminal. The first and second subframes include length information of MPDUs included in the first and second subframes, and the length information of the MPDU included in the second subframe is 0.

In another aspect, a device for receiving a data frame in a receiving terminal in a wireless communication system includes a frame receiving unit for receiving a data frame transmitted from a transmitting terminal and including at least one first subframe and at least one second subframe, and a frame transmitting unit for transmitting an ACK frame for the data frame to the transmitting terminal. The first and second subframes include length information of MPDUs included in the first and second subframes, and the length information of the MPDU included in the second subframe is 0.

Advantageous Effects

According to the present invention, it is possible to provide a new data frame format that may be used in a wireless communication system.

In addition, according to the present invention, a data frame format based on an existing specification is provided, thereby making it possible to ensure compatibility in the transceiving of a data frame.

Further, according to the present invention, in the wireless communication system, the data frame is generated so that the temporal lengths of data frames transmitted to each of the plurality of receiving terminals in the same transmission period are the same, thereby making it possible to solve a frame reception-disabled problem that occurs due to a difference in a length between the data frames.

MODE FOR INVENTION

Hereinafter, most preferred embodiments of the present invention will be described in detail with reference to the accompanying drawings so that those skilled in the art may easily implement the spirit of the present invention. The above-mentioned objects, features, and advantages will become obvious from the following detailed description provided in relation to the accompanying drawings. Further, in describing the present invention, when a detailed description of well-known technology associated with the present invention may unnecessarily make unclear the spirit of the present invention, a detailed description thereof will be omitted.

Figure 1:
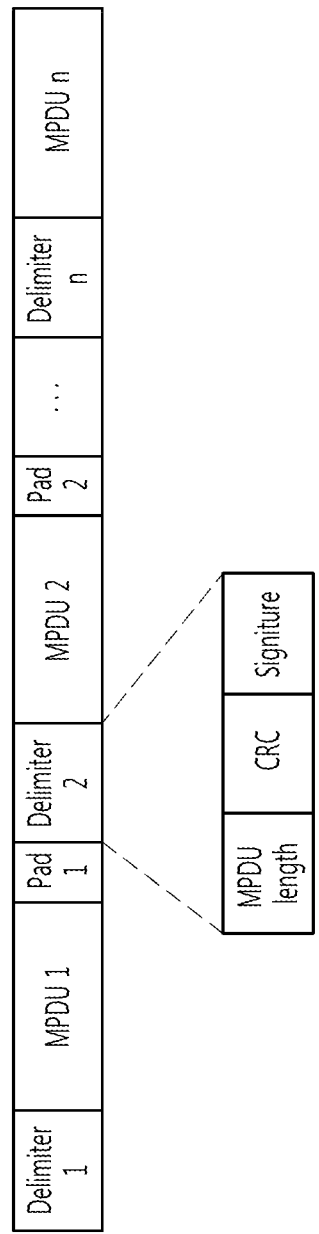
FIG. 1 is a diagram for explaining a structure of an aggregated MAC protocol data unit (A-MPDU).

FIG. 1 is a diagram for explaining a structure of an aggregated MAC protocol data unit (A-MPDU).

As shown in FIG. 1, the A-MPDU frame includes a plurality of (where n indicates a natural number) of subframes. The subframe includes a delimiter, an MPDU, and a pad. The delimiter is positioned in front of the MPDU and used to identify the MPDU. The standard specifies a gap between two starting positions for two consecutive subframes has a size of integer times of 32 bits, that is, 4 bytes. Here, the pad is used to allow the gap between two starting positions for two subframes has a size of the A-MPDU to be integer times of 32 bits. Therefore, as shown in FIG. 1, a final subframe does not include the pad. The pad may have a size of 0 to 3 bytes.

The delimiter includes MPDU length information, a cyclic redundancy check (CRC) for ensuring integrity of the delimiter, and a signature characterizing the delimiter.

Figure 2:
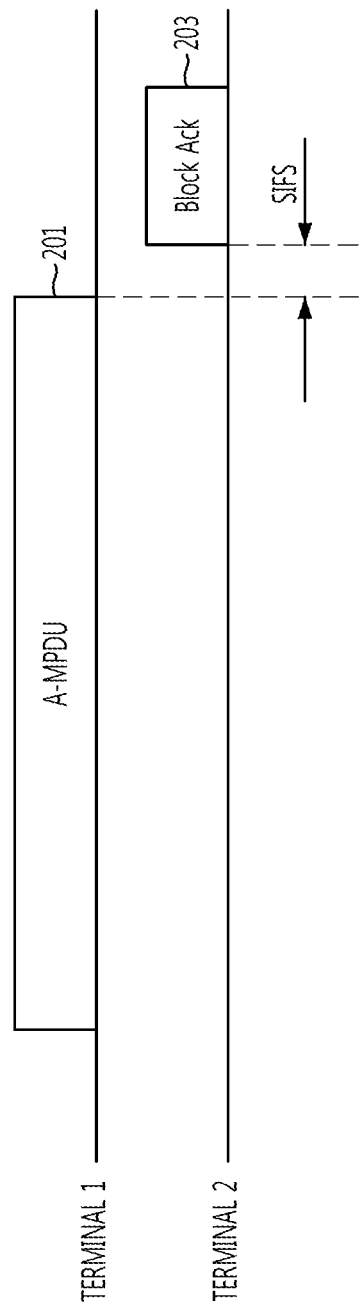
FIG. 2 is a diagram for explaining an acknowledge method according to reception of a data frame.

FIG. 2 is a diagram for explaining an acknowledge method according to reception of a data frame.

As shown in FIG. 2, a second terminal that has received the A-MPDU 201 shown in FIG. 1 transmitted from a first terminal transmits an acknowledge frame 203 to a transmitting apparatus according to a preset acknowledge policy. Here, the second terminal receives the A-MPDU, and then transmits a block acknowledge (ACK) frame to the first terminal after a short inter frame space (SIFS). The second terminal may also transmit the block ACK frame to the first terminal after it receives a separate block ACK request frame. However, in order to increase transmission efficiency in the MAC layer, a method of transmitting the block ACK frame without the separate block ACK request frame is mainly used.

Meanwhile, the demand for an increase in data throughput provided from a single basic service set (BSS) has recently increased. As a method for increasing the throughput, a multi-user multiple-input multiple-output (MU-MIMO) technology and a multi-frequency channel technology have been mainly studied. In the case of using these technologies, a single terminal may simultaneously transceive data from/to a plurality of terminals through a multi-path using a multi-channel or a MU-MIMO. Therefore, the throughput of the BSS may be significantly increased.

However, when communication is performed using the multi-path, transmission and reception may not be simultaneously performed with respect to each path. For example, when the first terminal performs communication using second and third channels, it may not receive data through the third channel while transmitting data through the second channel. That is, the first terminal may simultaneously transmit the data through the second and third channels or simultaneously receive the data through the second and third channels.

Therefore, when the plurality of terminals transceives data frames using the multi-path and lengths of the data frames transceived through each path are different, a problem may occur in transceiving the data. A more detailed description thereof will be provided with reference to FIG. 3.

Figure 3:
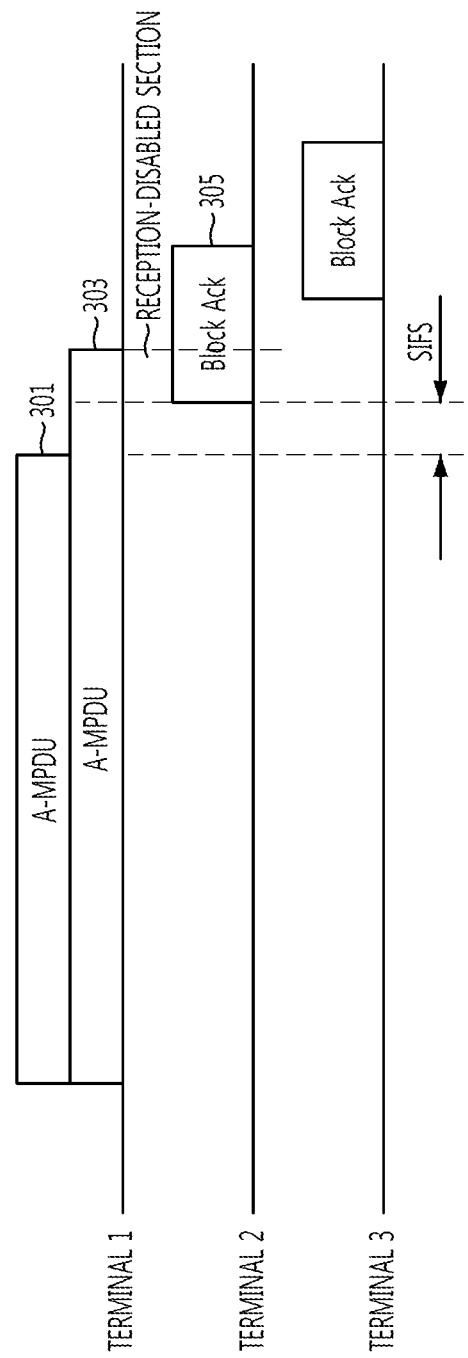
FIG. 3 is a diagram for explaining a method for transceiving a data frame and an acknowledge frame.

FIG. 3 is a diagram for explaining a method for transceiving a data frame and an acknowledge frame.

As described in FIG. 2, the receiving terminal transmits the ACK frame for the received data frame. Therefore, a difference occurs in the times in which the receiving terminal transmits the ACK frames according to the lengths of the received data frames. When the plurality of terminals transmit the ACK frames through the multi-path, a difference may occur in transmission times of the ACK frames for each path.

More specifically, as shown in FIG. 3, since a temporal length of a data frame 301 transmitted from a first terminal to a second terminal is shorter than that of a data frame 303 from the first terminal to a third terminal, the second terminal may transmit an ACK frame 305 to the first terminal while the third terminal receives the data frame 303 from the first terminal. Therefore, even though the second terminal transmits the ACK frame 305 to the first terminal after a SIFS, collision between the data frame 303 and the ACK frame 305 may occur. In this case, since the second terminal transmits the ACK frame 305 to the first terminal while the first terminal transmits the data frame 303 to the third terminal, a problem that the first terminal does not receive the ACK frame from the second terminal may occur.

The present invention suggests a new data frame format for solving the above-mentioned problem. A data frame according to the present invention further includes a subframe including data length information, which is 0. Here, a fact that the length information is 0 means that the data is not actually included in the subframe. For example, when the data frame is an aggregated MPDU frame, the MPDU length information becomes 0, that is, an MPDU length value becomes 0. That is, the data frame according to the present invention further includes the subframe allowing temporal lengths of data frames transmitted to each of a plurality of terminal to be the same, thereby making it possible to solve the above-mentioned problem.

For example, when a temporal length of a first data frame to be transmitted through a first channel is 5 and a temporal length of a second data frame to be transmitted through a second channel is 4, a subframe in which the MPDU length information is 0 may be additionally included in the second data frame. Therefore, temporal lengths of the first and second data frames may become the same, and terminals receiving each of the first and second data frames may transmit ACK frames without collision of the frame.

Meanwhile, a size of the data frame according to the present invention may be determined according to a preset size in a specification of a communication system. In addition, the data frame according to the present invention may further include a pad allowing the size of the data frame to coincide with the preset size.

Hereinafter, the present invention will be described in detail with reference to the accompanying drawings. A case in which a data frame is an aggregated MPDU (A-MPDU) is described by way of example with reference FIGS. 4 and 5.

Figure 4:
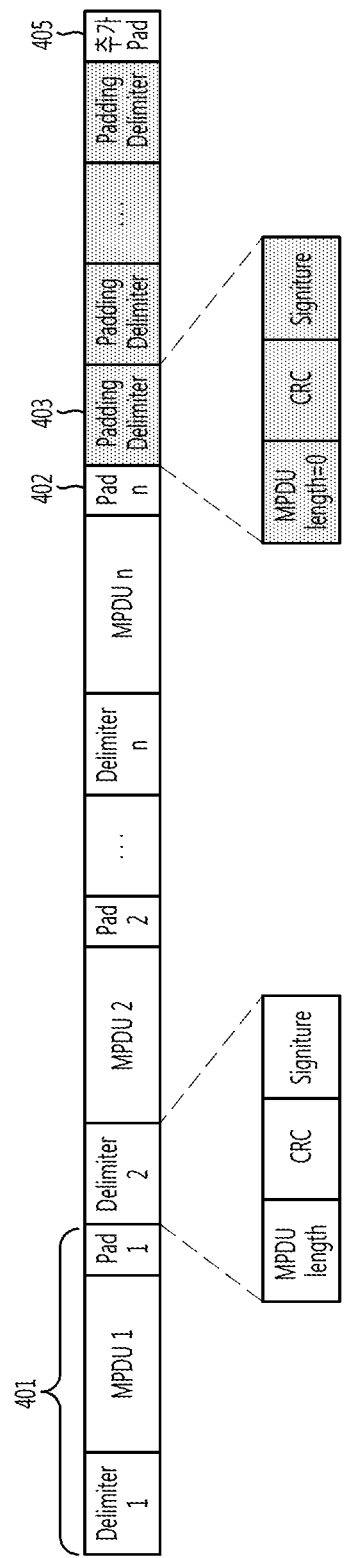
FIGS. 4 and 5 are diagrams for explaining a data frame according to an embodiment of the present invention.
Figure 5:
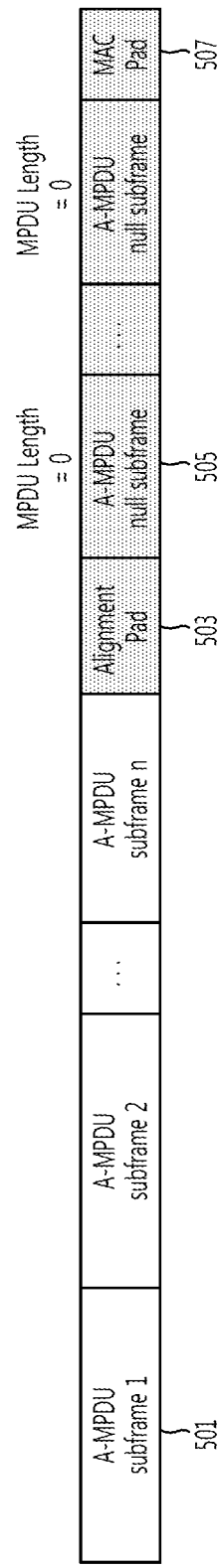

FIGS. 4 and 5 are diagrams for explaining a data frame according to an embodiment of the present invention.

As shown in FIG. 4, a data frame according to the present invention includes a subframe 401 and a padding delimiter 403. Here, the data frame according to the present invention may include at least one subframe and at least one padding delimiter. In FIG. 4, n indicates a natural number.

The padding delimiter 403 includes length information of an MPDU, a CRC, and a signature, similar to the above-mentioned delimiter. However, since the MPDU is not positioned after the padding delimiter 403 according to the present invention, the length information of the MPDU including the padding delimiter 403 becomes 0. That is, the padding delimiter 403 corresponds to the above-mentioned subframe having the MPDU length information of 0.

The number of padding delimiters 403 may be determined so that temporal lengths of data frames transmitted to each of a plurality of receiving terminals in the same transmission period are the same. That is, when the number of padding delimiters 403 may be determined so that when the data frames are simultaneously transmitted to each of the plurality of receiving terminals in the same transmission period through a multi-channel or an MU-MIMO scheme, the temporal lengths of the data frames transmitted to each of the plurality of receiving terminals in the same transmission period are the same. For example, the number of padding delimiters may be determined based on a data frame having the longest length among the data frames transmitted through each channel.

Meanwhile, a gap between starting points of two subframes may be determined so as to be integer times of a preset unit size. For example, when the unit size is 4 bytes, the gap between starting points of two subframes may be integer times of 4 bytes. Therefore, a size of the subframe 401 may be integer times of 4 bytes. Here, the padding delimiter 403 may have the above-mentioned unit size. When a plurality of padding delimiters are used, sizes of each of the plurality of padding delimiters become integer times of 4 bytes.

Here, the data frame according to the present invention may further include a first adding pad 402. The first adding pad may be positioned between the subframe and the padding delimiter. The first adding pad is used to allow time intervals of each of the subframe and the padding delimiter to be integer times of a preset unit size. The padding delimiter 403 may be a subframe having the MPDU length of 0. As a result, the first adding pad 402 is used to allow the time intervals of each of the subframes to be integer times of the preset unit size.

That is, in the case of the A-MPDU shown in FIG. 1, the pad is not included in the final subframe. However, the data frame according to the present invention may further include the first adding pad 402. The gap between two subframes and the padding delimiter may become integer times of the preset unit size by the first adding pad 402. In addition, a size of the data frame including the first adding pad, the subframe, and the padding delimiter may become integer times of a preset unit size. For example, when the unit size is 4 bytes, the first adding pad may have a size of 0 to 3 bytes.

Meanwhile, a transmitting terminal of the data frame may provide the data frame to a receiving terminal in a state in which length information of the data frame is allowed to be included in a separate signal field so that the receiving terminal of the data frame may easily decode the data frame. Here, the length information of the data frame included in the signal field may be a value obtained by adding the length of the subframe to the length of the first adding frame. When the MPDU length information of the padding delimiter 403 is 0, the length information of the data frame included in the signal field may not include the length information of the padding delimiter 403.

The above-mentioned data frames are processed in a physical layer of the transmitting terminal in preset modulation and coding schemes and are transmitted to a plurality of receiving terminals through a multi-path, for example, a multi-channel or an MU-MIMO. Here, when the modulation and coding schemes, that is, modulation and coding scheme (MCS) levels, used to transmit data to each of the plurality of receiving terminals are different, it may be difficult to coincide the temporal lengths of the data frames transmitted in the physical layer through the multi-path with each other only using the above-mentioned first adding pad and padding delimiter. The modulation and coding scheme may be changed according to the MCS level.

More specifically, the data frame is generally processed in a preset symbol unit in the physical layer. For example, in the case in which an orthogonal frequency division multiplexing (OFDM) scheme is used, the data frame is processed and transmitted in an OFDM symbol unit (e.g. 4 μs) in the physical layer. That is, since the aggregated MPDU is reprocessed in the preset modulation and coding schemes in the physical layer for transmission to the receiving terminal, even though the first adding pad and the padding delimiter are used, the temporal length of the data frame transmitted in the physical layer through the multi-path may not coincide with the preset symbol unit.

Therefore, the data frame according to the present invention may include a second adding pad 405. When the data frame is transmitted in the physical layer in the preset modulation and coding scheme, the temporal length of the data frame in the physical layer may be integer times of a preset unit length. Here, the unit length may be, for example, the above-mentioned OFDM symbol unit, and the second adding pad may have a size of, for example, 0 to 3 bytes. In this case, a physical protocol data unit (PPDU), which is a data processing unit of the physical layer, may include the first adding pad, the padding delimiter, the second adding pad, and the pad of the physical layer.

As a result, according to the present invention, the temporal lengths of the data frames transmitted to each of the plurality of receiving terminals in the same transmission period may become the same, and the receiving terminals receiving the data frames may transmit the ACK frames without collision of the frames. The first adding pad, the padding delimiter 403, and the second adding pad 405 may be included in the data frame so that they are sequentially positioned after the subframe 401.

Meanwhile, a data frame of FIG. 5 has the same configuration as that of the data frame of FIG. 4 and corresponds to the data frame of FIG. 4. However, in the case of FIG. 4, the subframe 501 is represented by the delimiter, the MPDU, and the pad; however, in the case of FIG. 5, a first subframe 501 is represented by a subframe block.

As shown in FIG. 5, the data frame of FIG. 5 according to the present invention includes a first subframe 501, a first pad 503, a second subframe 505, and a second pad 507. The data frame according to the present invention may include at least one first subframe and at least one second subframe. In FIG. 5, n indicates a natural number.

The first subframe 501 of FIG. 5 corresponds to the subframe 401 of FIG. 4, and the second subframe 505 of FIG. 5 corresponds to the padding delimiter 403 of FIG. 4. That is, the second subframe 505 may be a delimiter. The first pad 503 of FIG. 5 corresponds to the first adding pad of FIG. 4, and the second pad 507 of FIG. 5 corresponds to the second adding pad 405 of FIG. 4.

As described above, a size of the data frame may be integer times of a preset unit size. The first pad 503 may be called an alignment pad since it is used to allow time intervals of each of the first and second subframes 501 and 505 to be integer times of a preset unit size. In addition, the second subframe 505 may be called a null subframe since it does not include a MPDU and has data length information of 0. The second pad 507 may be called a MAC pad so that it is distinguished from a pad added to a PPDU in the physical layer.

Meanwhile, although the case in which the data frame is the aggregated MPDU has been described by way of example with reference to FIGS. 4 and 5, the data frame may also include data in other format than the MPDU, provided in the first subframe thereof. Further, even in this case, the second subframe, the first pad, and the second pad may be included in the data frame. The second subframe, the first pad, and the second pad are not always included in the data frame but may be included in the data frame according to the lengths of the data frames transmitted to each of the plurality of receiving terminals in the same transmission period, the preset unit sizes of the data frames, the MCS levels, and the like, as described above.

Figure 6:
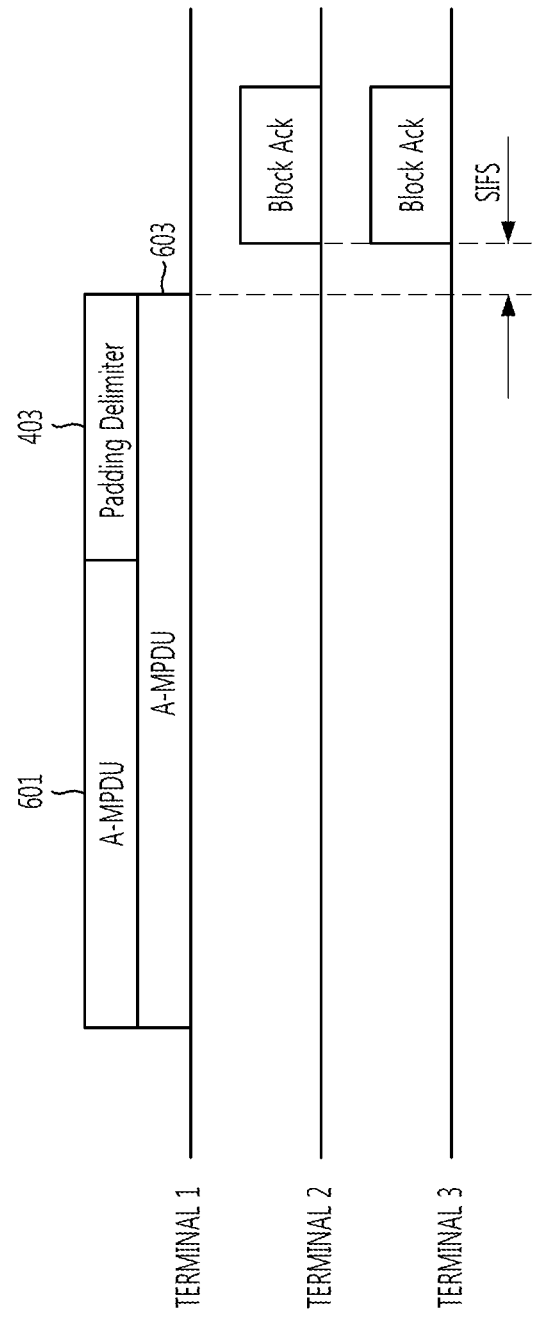
FIG. 6 is a diagram for explaining a method for transceiving a data frame and an acknowledge frame according to the present invention.

FIG. 6 is a diagram for explaining a method for transceiving a data frame and an acknowledge frame according to the present invention.

FIG. 6 shows a case in which a first terminal is to transmit each of first and second data frames 601 and 603 to each of second and third terminals using two channels. Here, as shown in FIG. 6, the first data frame 601 has a temporal length shorter than that of the second data frame 603.

According to the present invention, the first terminal generates the first data frame 601 including the padding delimiter 403 and transmits the generated first data frame 601 to the second terminal. The first terminal may generate the first data frame 601 so as not to include the padding delimiter or so as to include at least one padding delimiter according to a temporal length of the second data frame 603.

As a result, a time in which the second terminal transmits an ACK frame may be delayed by a length of the padding delimiter 403. Therefore, when the second and third terminals receive each of the first and second frames 601 and 603 and then transmit the ACK frames after an SIFS, collision between frames may be prevented. Meanwhile, the first terminal may generate the first data frame 601 further including the first pad 503 and the second pad 507.

Hereinafter, methods for generating, transmitting and receiving a data frame in a wireless communication system according to the present invention will be described in detail with reference to FIGS. 7 to 9 together with FIGS. 4 to 6. Here, a data frame may be the data frame described with reference to FIGS. 4 and 5, and a wireless communication system may be a wireless local area network (WLAN) system. A method for generating a data frame in an apparatus for generating a data frame will be described by way of example with reference to FIG. 7, and a method for transmitting a data frame in an apparatus for transmitting a data frame will be described by way of example with reference to FIG. 8. In addition, a method for receiving a data frame in an apparatus for receiving a data frame will be described by way of example with reference to FIG. 9. The apparatuses for generating, transmitting and receiving a data frame may be a communication apparatus including an access point, a station, a terminal, or the like, and the terminal is a concept including the access point and the station.

Figure 7:
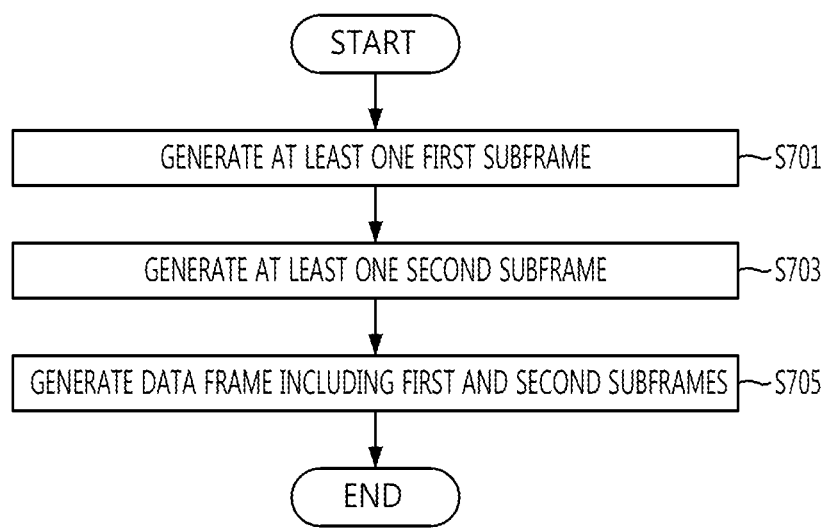
FIG. 7 is a diagram for explaining a method for generating a data frame according to an embodiment of the present invention.

FIG. 7 is a diagram for explaining a method for generating a data frame according to an embodiment of the present invention. As shown in FIG. 7, the method for generating a data frame according to the present invention starts from operation (S701).

In operation (S701), an apparatus for generating a data frame generates at least one first subframe.

In operation (S703), the apparatus for generating a data frame generates at least one second subframe. Here, the first and second subframes include length information of media access control (MAC) protocol data units (MPDUs) included in the first and second subframes, and the length information of the MPDU included in the second subframe is 0. The data frame may be an aggregated MPDU (A-MPDU) frame. In this case, the second subframe may be a delimiter.

Then, in operation (S703), the apparatus for generating a data frame may generate at least one second subframe so that temporal lengths of data frames transmitted to each of a plurality of receiving terminals in the same transmission period are the same. That is, when the data frames are transmitted to each of the plurality of receiving terminals in the same transmission period through a multi-channel or an MU-MIMO scheme, the apparatus for generating a data frame may generate the second subframe so that the temporal lengths of the transmitted data frames are the same.

In operation (S705), the apparatus for generating a data frame generate a data frame including the first and second subframes. Time intervals of each of the first subframes may be determined so as to be integer times of a preset unit size, and each of the second subframes may have a unit size. For example, the unit size may be 4 bytes.

Meanwhile, the method for generating a data frame according to the present invention may further include generating a first pad included in the data frame. Here, the sum of sizes of the first subframe and the first pad becomes integer times of a preset unit size. That is, the first pad is used to allow time intervals of each of the first and second subframes to be integer times of the preset unit size.

In addition, the method for generating a data frame according to the present invention may further include a second pad included in the data frame. When the data frame is transmitted in a physical layer in a preset modulation and coding scheme, a size of the data frame in the physical layer may become integer times of a preset unit size. Here, the unit size may be, for example, an OFDM symbol unit.

Figure 8:
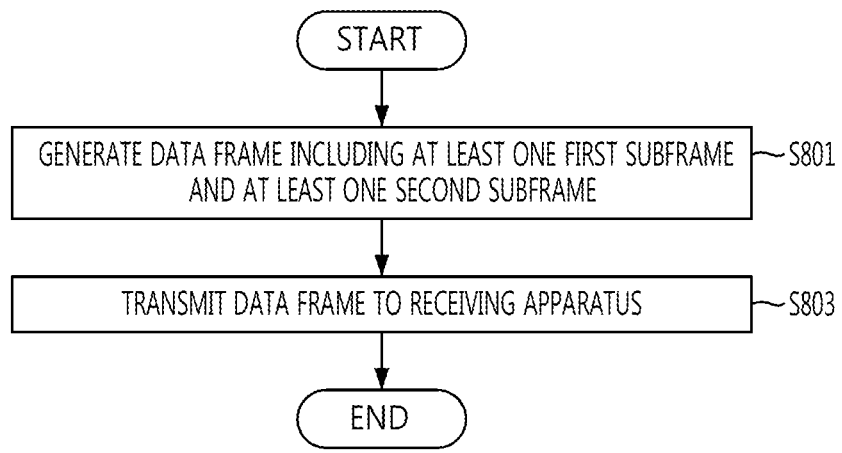
FIG. 8 is a diagram for explaining a method for transmitting a data frame according to an embodiment of the present invention.

FIG. 8 is a diagram for explaining a method for transmitting a data frame according to an embodiment of the present invention. As shown in FIG. 8, the method for transmitting a data frame according to the present invention starts from operation (S801).

In operation (S801), an apparatus for transmitting a data frame generates a data frame including at least one first subframe and at least one second subframe. Here, the first and second subframes include length information of media access control (MAC) protocol data units (MPDUs) included in the first and second subframes, and the length information of the MPDU included in the second subframe is 0. That is, the data frame may be an aggregated MPDU (A-MPDU) frame, and the second subframe may be a delimiter.

More specifically, the generating (S801) of the data frame including at least one first subframe and at least one second subframe may include generating the first subframe; and generating at least one second subframe so that temporal lengths of data frames transmitted to each of a plurality of receiving terminals in the same transmission period are the same.

In operation (S803), the apparatus for transmitting a data frame transmits the data frame to a receiving terminal. In addition, time intervals of each of the first subframes may be determined so as to be integer times of a preset unit size, and each of the second subframes may have a unit size. For example, the unit size may be 4 bytes.

Meanwhile, the generating (S801) of the data frame including at least one first subframe and at least one second subframe may including generating a first pad included in the data frame. Here, the sum of sizes of the first subframe and the first pad may be integer times of a preset unit size. That is, the first pad is used to allow time intervals of each of the first and second subframes to be integer times of the preset unit size.

In addition, the generating (S801) of the data frame including at least one first subframe and at least one second subframe may including generating a second pad included in the data frame. Here, when the data frame is transmitted in a physical layer in a preset modulation and coding scheme, a size of the data frame in the physical layer may be integer times of a preset unit size. Here, the unit size may, for example, be an OFDM symbol unit.

Figure 9:
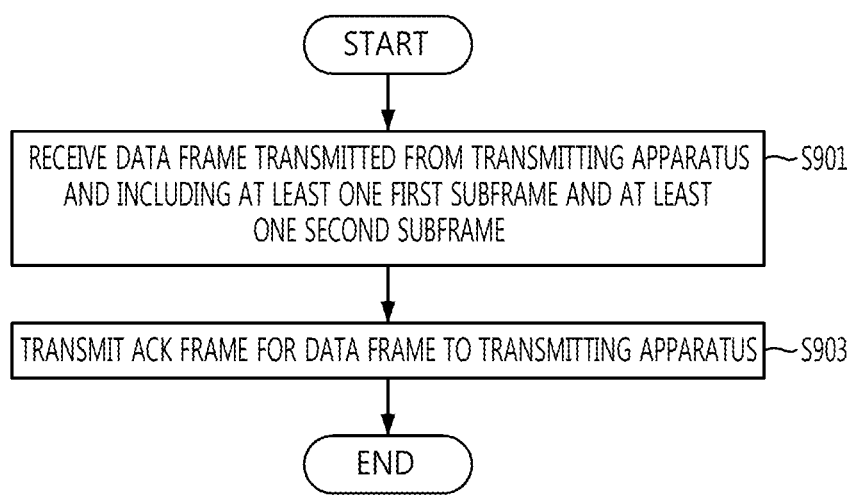
FIG. 9 is a diagram for explaining a method for receiving a data frame according to an embodiment of the present invention.

FIG. 9 is a diagram for explaining a method for receiving a data frame according to an embodiment of the present invention.

As shown in FIG. 9, the method for receiving a data frame according to the present invention starts from operation (S901).

In operation (S901), an apparatus for receiving a data frame receives a data frame transmitted from a transmitting terminal and including at least one first subframe and at least one second subframe. The first and second subframes include length information of media access control (MAC) protocol data units (MPDUs) included in the first and second subframes, and the length information of the MPDU included in the second subframe is 0. That is, the data frame may be an aggregated MPDU (A-MPDU) frame, and the second subframe may be a delimiter.

The second subframe may be a subframe generated in order to allow temporal lengths of data frames transmitted to each of a plurality of receiving terminals in the same transmission period to be the same. In addition, time intervals of each of the first subframes may be determined so as to be integer times of a preset unit size, and each of the second subframes may have a unit size. For example, the unit size may be 4 bytes.

In operation (S903), the apparatus for receiving a data frame transmits an ACK frame for the data frame to the transmitting terminal. Here, the apparatus for receiving a data frame may receive the data frame and then transmit a block ACK frame to the transmitting terminal after an SIFS.

Meanwhile, the data frame may further include a first pad. Here, the sum of sizes of the first subframe and the first pad becomes integer times of a preset unit size. That is, the first pad is used to allow time intervals of each of the first and second subframes to be integer times of the preset unit size.

In addition, the data frame may further include a second pad. Here, when the data frame is transmitted in a physical layer in a preset modulation and coding scheme, a size of the data frame in the physical layer is integer times of a preset unit size.

Meanwhile, although the present invention has been described in terms of processes in FIGS. 1 to 8, each operation configuring the methods for generating, transmitting and receiving a data frame according to the present invention may be easily recognized in terms of apparatuses. It may be understood that the operations included in the methods for generating, transmitting and receiving a data frame according to the present invention correspond to components included in the apparatuses for generating, transmitting and receiving a data frame according to a principle of the present invention. Here, the apparatuses for generating, transmitting and receiving a data frame may be a communication apparatus including an access point, a station, a wireless terminal, or the like.

That is, the apparatus for generating a data frame in a wireless communication system according to an embodiment of the present invention includes a first frame generating unit generating at least one first subframe; a second frame generating unit generating at least one second subframe; and a third frame generating unit generating a data frame including the first and second subframes, wherein the first and second subframes include length information of MPDUs included in the first and second subframes, and the length information of the MPDU included in the second subframe is 0.

In addition, the apparatus for transmitting a data frame according to an embodiment of the present invention includes a frame generating unit generating a data frame including at least one first subframe and at least one second subframe; and a frame transmitting unit transmitting the data frame to a receiving terminal, wherein the first and second subframes include length information of MPDUs included in the first and second subframes, and the length information of the MPDU included in the second subframe is 0.

Further, the apparatus for receiving a data frame according to an embodiment of the present invention includes a frame receiving unit receiving a data frame transmitted from a transmitting terminal and including at least one first subframe and at least one second subframe; and a frame transmitting unit transmitting an ACK frame for the data frame to the transmitting terminal, wherein the first and second subframes include length information of MPDUs included in the first and second subframes, and the length information of the MPDU included in the second subframe is 0.

Meanwhile, the methods for generating, transmitting and receiving a data frame according to the present invention as described above may be implemented by a computer program. Codes and code segments configuring the computer program may be easily deduced by computer programmers in the art. In addition, the computer program is stored in computer readable recording media (information storage media) and is read and executed by computers, thereby implementing the methods according to the present invention. In addition, the computer readable recording media includes all types of recording media (non-tangible media such as a carrier as well as tangible media such as a compact disk (CD), a digital versatile disk (DVD)) that may be recorded by the computers.

Although the present invention has been described with reference to exemplary embodiments and the accompanying drawings, it would be appreciated by those skilled in the art that the present invention is not limited thereto but various modifications and alterations might be made without departing from the scope defined in the claims and their equivalents.

The invention claimed is:

1. A method for communicating over a wireless local area network, comprising:
   generating, by a transmitter, an initial data block;
   adding, by the transmitter, zero or more first padding unit to the initial data block to generate a first padded block if a length of the initial data block is less than a target length, wherein a length of the first padded block is a multiple of a first predetermined length;
   adding, by the transmitter, one or more second padding unit to the first padded block to generate a second padded block if the length of the first padded block is less than the target length, wherein a length of the second padded block is a multiple of a second predetermined length; and
   transmitting, by the transmitter, the second padded block if the length of the second padded block is equal to the target length,
   wherein the first and second padding units have different lengths from each other.

2. The method of claim 1, wherein each of the first predetermined length and the second predetermined length has a value of four bytes.

3. The method of claim 1, wherein the first padding unit has a length of one byte.

4. The method of claim 1, wherein the second padding unit has a length of four bytes.

5. The method of claim 1, wherein the transmitting, by the transmitter, the second padded block further comprises:
   if the length of the second padded block is less than the target length, adding one or more third padding unit to the second padded block to generate a third padded block so that a length of the third padded block is equal to the target length; and
   transmitting the third padded block.

6. The method of claim 5, wherein the third padding unit has a length of one byte.

7. The method of claim 5, wherein the second padded block or the third padded block is transmitted as an aggregate medium access control (MAC) protocol data unit (A-MPDU).

8. The method of claim 1, wherein the initial data block includes a plurality of aggregated media access control protocol data unit (A-MPDU) subframes, each of the plurality of A MPDU subframes having a length of a multiple of 4 bytes except for a last A-MPDU subframe.

9. The method of claim 1, wherein the second padding unit includes an aggregated media access control protocol data unit (A-MPDU) subframe.

10. The method of claim 9, wherein the A-MPDU subframe includes length information of each media access control (MAC) protocol data unit (MPDU), and wherein the length information of the second padding unit has a value of zero.

11. The method of claim 1, wherein the second padding unit includes delimiter information.

12. The method of claim 11, wherein the delimiter information includes length information of a media access control (MAC) protocol data unit (MPDU), a cyclic redundancy check (CRC), and a signature information, and wherein the length information has a value of zero.

13. The method of claim 1, wherein the target length is determined based on a length of a longest frame from among frames.

14. The method of claim 1, wherein the first and second predetermined lengths have the same value.

15. An apparatus for transmitting a data block in a wireless communication system, comprising a processor configured for:
   generating an initial data block;
   adding zero or more first padding unit to the initial data block to generate a first padded block if a length of the initial data block is less than a target length, wherein a length of the first padded block is a multiple of a first predetermined length;
   adding one or more second padding unit to the first padded block to generate a second padded block if the length of the first padded block is less than the target length, wherein a length of the second padded block is a multiple of a second predetermined length; and
   transmitting the second padded block if the length of the second padded block is equal to the target length,
   wherein the first and second padding units have different lengths from each other.

16. The apparatus of claim 15, wherein each of the first predetermined length and the second predetermined length has a value of four bytes.

17. The apparatus of claim 15, wherein the first padding unit has a length of one byte.

18. The apparatus of claim 15, wherein the second padding unit has a length of four bytes.

19. The apparatus of claim 15, wherein the processor is configured for further:
   if the length of the second padded block is less than the target length, adding one or more third padding unit to the second padded block to generate a third padded block so that a length of the third padded block is equal to the target length; and
   transmitting the third padded block.

20. The apparatus of claim 19, wherein the third padding unit has a length of one byte.

21. The apparatus of claim 19, wherein the second padded block or the third padded block is transmitted as an aggregate medium access control (MAC) protocol data unit (A-MPDU).

22. The apparatus of claim 15, wherein the initial data block includes a plurality of aggregated media access control protocol data unit (A-MPDU) subframes, each of the plurality of A-MPDU subframes having a length of a multiple of 4 bytes except for a last A-MPDU subframe.

23. The apparatus of claim 15, wherein the second padding unit includes an aggregated media access control protocol data unit (A-MPDU) subframe.

24. The apparatus of claim 23, wherein the A-MPDU subframe includes length information of each media access control (MAC) protocol data unit (MPDU), and wherein the length information of the second padding unit has a value of zero.

25. The apparatus of claim 15, wherein the second padding unit includes delimiter information.

26. The apparatus of claim 25, wherein the delimiter information includes length information of a media access control (MAC) protocol data unit (MPDU), a cyclic redundancy check (CRC), and a signature information, and wherein the length information has a value of zero.

27. The apparatus of claim 15, wherein the target length is determined based on a length of a longest frame from among frames.

28. A method for communicating over a wireless local area network, the method comprising:
   generating, by a transmitter, an initial data block;
   adding, by the transmitter, at most three first padding units to the initial data block to generate a first padded block if a length of the initial data block is less than a target length, so that a length of the first padded block becomes a multiple of a first predetermined length;

adding, by the transmitter, one or more second padding unit to the first padded block to generate a second padded block if the length of the first padded block is less than the target length, so that a length of the second padded block becomes a multiple of a second predetermined length; and adding, by the transmitter, at most three third padding units to the second padded block to generate a third padded block if the length of the second padded block is less than the target length, so that a length of the third padded block becomes equal to the target length, wherein the second padded block is transmitted if the second padded block is equal to the target length, and the third padded block is transmitted if the second padded block is not equal to the target length, and wherein the first and second padding units have different lengths from each other.

* * * * *